PERIODIC SYSTEM OF THE ELEMENTS

FIG.1

PERIODIC SYSTEM OF THE ELEMENTS

| Period | Group I | Group II | Group III | Group IV | Group V | Group VI | Group VII |
|---|---|---|---|---|---|---|---|
| I | H | | | | | | |
| II | Li | Be | B | C | N | O | F |
| III | Na | Mg | Al | Si | P | S | Cl |
| IV | K | Ca | Sc | Ti | V | Cr | Mn |
| | Cu | Zn | Ga | Ge | As | Se | Br |
| V | Rb | Sr | Y | Zr | Nb Cb | Mo | Tc |
| | Ag | Cd | In | Sn | Sb | Te | I |
| VI | Cs | Ba | Tl | Hf | Ta | W | Re |
| | Au | Hg | | Pb | Bi | Po | At |
| VII | Fr | Ra | Ac | | | | |

FIG. 2

United States Patent Office 3,767,758
Patented Oct. 23, 1973

3,767,758
PROCESS FOR THE PREPARATION OF SALTS OF HYDROXYLAMINE
Pieter Mars, Enschede, Coenraad J. Duyverman, Sittard, and Martin J. Gorgels, Stein, Netherlands, assignors to Stamicarbon N.V., Heerlen, Netherlands
Continuation of abandoned application Ser. No. 783,728, Dec. 13, 1968. This application July 1, 1971, Ser. No. 159,063
Claims priority, application Netherlands, Dec. 14, 1967, 6717085
Int. Cl. C01b 21/00
U.S. Cl. 423—302
4 Claims

ABSTRACT OF THE DISCLOSURE

Salts of hydroxylamine are prepared by reduction of nitric acid with hydrogen in an acid medium and a catalyst containing a metal from the platinum group of metals and an activator selected from the group of metals including copper, germanium, cadmium, indium, tin, gallium, silver, arsenic, thallium, antimony, gold, mercury, lead and bismuth. The reaction catalyst exhibits a high selectivity and conversion.

CROSS-REFERENCE TO RELATED APPLICATION

This application is a continuation of our earlier co-pending application Ser. No. 783,728, filed on Dec. 13, 1968, and now abandoned.

The present invention relates to the preparation of salts of hydroxylamine by reducing nitric acid with hydrogen in an acid medium with the aid of a catalyst containing at least one metal from the platinum group.

The invention also relates to a catalyst system to be used in the preparation of hydroxylamine by reduction of nitric acid with hydrogen in an acid medium and to salts of hydroxylamine prepared by the process according to the invention with the aid of a catalyst system according to the invention.

It is known that in a similar manner salts of hydroxylamine can be prepared, starting from nitrogen oxide or nitrous acid. These processes have, inter alia, the drawbacks that the above-mentioned compounds are more expensive in the required pure form than nitric acid, that the use of nitrogen oxide involves technological difficulties and that the nitrous acid is unstable. The processes are therefore preferably started from nitric acid.

A drawback of the method of preparation using nitric acid is that a relatively small yield of hydroxylamine is obtained per unit weight of noble metal contained in the catalyst. To obtain a good yield, it is of great importance that the reduction is carried out in a suitable medium. It is preferably effected in a buffered medium obtained by making the starting solution, in addition to nitrate ions, containing a mixture of an acid from the phosphoric acid group and/or the sulphuric acid group and a soluble salt derived from one of these acids. Thus in the preferred embodiment the reaction is conducted in an aqueous buffered acidic medium containing, as the acidic buffering agent, phosphoric acid and sulfuric acid in admixture with their respective alkali metal and ammonium salts. In that case, palladium is preferably used as the catalyst.

It is known in this connection that, if the process is started from nitrogen oxide and a platinum catalyst, a higher yield can be obtained if the selectivity is increased by effecting the reduction in the presence of one or more of the elements S, Se, Te, As, Sb, Pb or Hg. This addition has hardly any or no effect at all on the activity of the catalyst.

The investigations which have led to the present invention, have shown that in the preparation of salts of hydroxylamine from nitric acid—which, as will be clear, is in another state of oxidation than nitrogen oxide—the selectivity is hardly affected by the presence of the elements As, Cb, Bi, Pb or Hg. The elements S, Se and Te, on the other hand, have shown to cause a decrease of the activity.

Figure 1:
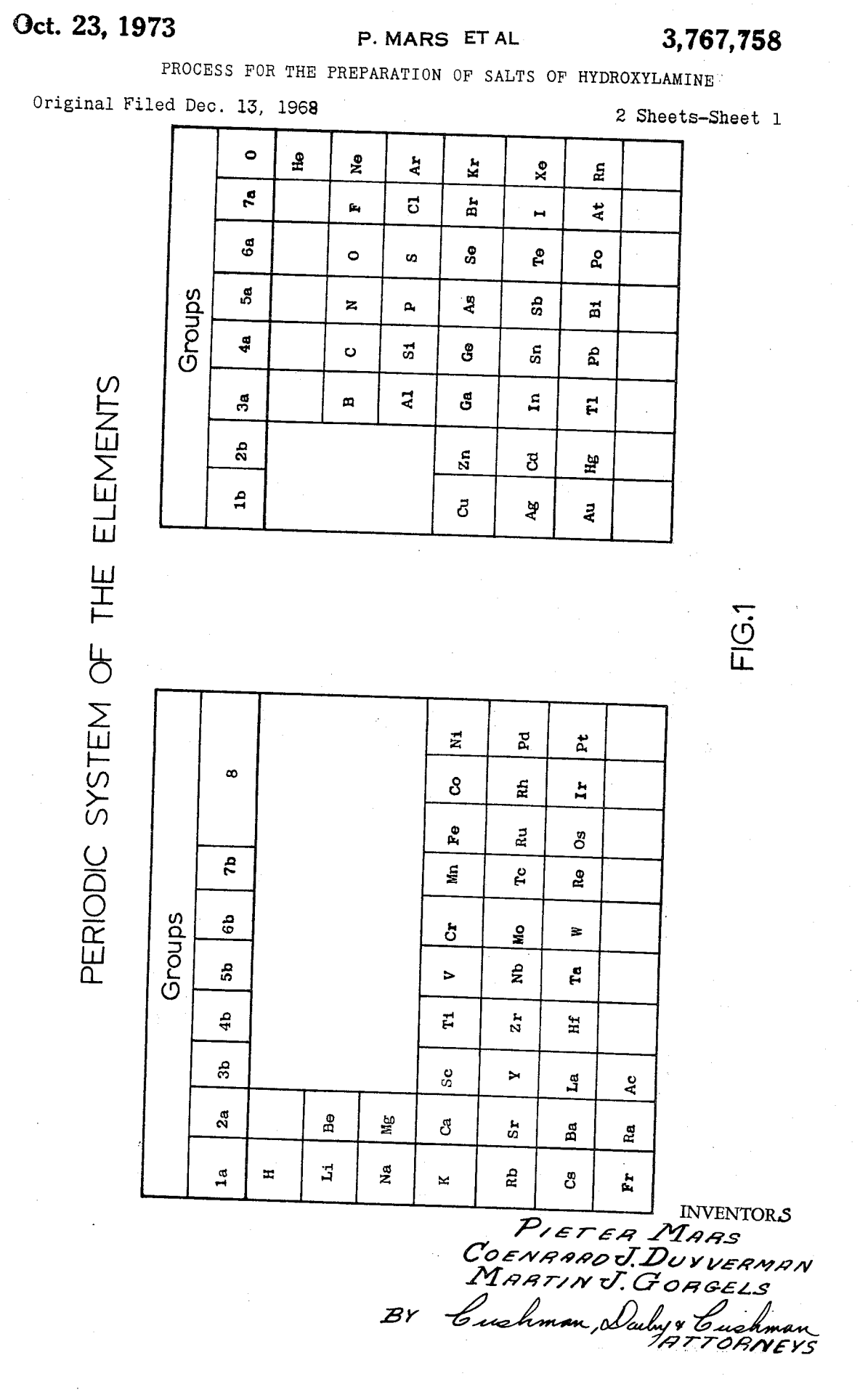

According to the invention, the reduction of nitric acid with hydrogen in an acid medium with the aid of a catalyst containing a metal from the platinum group increases the production of salts of hydroxylamine per unit weight of catalyst and has hardly any or no effect at all on the selectivity, if it is carried out in the presence of one or more of the elements from the groups 1b, 2b, 3a, 4a or 5a of the periodic system of the elements (periodic system according to "Handbook of Chemiestry and Physics," 44th ed., pp. 448 and 449; see the attached FIG. 1.). In addition to the above-mentioned technical advantage offered by the use of nitric acid as the starting product, there is also the advantage that the process now yields an output justifying its application on an industrial scale.

None of the elements of the above-mentioned groups of the periodic system of the elements causes a decrease of the selectivity of the reaction. This should not be considered as a general phenomenon. There are indeed elements which, upon being added to the reaction system, cause an increase of the activity (to be derived from the hydrogen uptake). The said increase of the activity is, however, attended with a lowering of the selectivity, as a result of which much more ammonia is formed. Elements of this type are e.g., Mo, Rh and Ru. In view of the required selectivity, Pd is preferred to other metals from the platinum group for being used as the catalyst in the preparation of a salt of hydroxylamine from nitric acid in the presence of the above-mentioned elements.

The elements from the groups 1b, 2b, 3a, 4a and 5a may be present in the reaction system as such, in the form of a compound or as a combination or a mixture of compounds. By compound is to be understood here an oxide, a salt in which the element forms part of the cation and/or the anion (e.g., nitrates, phosphates, sulphates, halogenides, acetates, stannates, arsenates, etc.), or a complex compound. The elements or compounds may be applied to the catalyst particles and/or be present in the reaction medium.

The capacity of the various elements for increasing the activity of the catalyst can, in decreasing order, be indicated by arranging the elements as follows: Cu, Ge, Cd, In, Sn>Ga, Ag>As, Ti>Sb, Au, Hg, Pb, Bi. The invention therefore relates in particular to the application of one or more elements from the periods IV and/or V of the group 1b, 2b, 3a or 4a of the periodic system of the elements (see the periodic system according to "Handbook of Chemistry and Physics," 44th ed., pp. 444 and 445, which system is shown in the attached FIG. 2).

The amount of activator required for attaining the maximum activity of the catalyst depends on the element employed. As the activity may also be affected by the medium, it is difficult to indicate absolute limits for this amount. Small amounts of the activator with respect to the amount of catalyst may already cause a large increase of the activity. In the case of a palladium catalyst, it will suffice to add a few atom-percent of the activating element with respect to the amount of Pd. The practical limits for Ge and In are, for instance, 0.2 and 5 atom-percent, for Cu 1 and 10 atom-percent and for Ag 5 and 20 atom-percent.

The invention will be elucidated by means of examples. The reactor used was a glass vessel with a capacity of 250 ml. which was provided with an agitator, a gas inlet and a device for introducing substances without allowing the contents of the reactor to come into contact with the surrounding atmosphere. Via a capillary, the gas inlet was connected to a source supplying hydrogen at constant pressure. During the experiment, the reactor was shut off from the surrounding atmosphere. The catalyst (in most of the experiments 5%-by-weight palladium on carbon) was, for a few hours, subjected to a hydrogen flow in the reactor. After that, 100 ml. of an acid aqueous solution containing nitrate ions, which was to be subjected to the reduction treatment, were introduced into the reactor with simultaneous passage of hydrogen. The reactor was shut off from the surrounding atmosphere and the agitator was started. Before or after the start of the reaction, a compound to be examined as to its capacity for increasing the activity of the process, which in most cases has been previously dissolved in a small amount of the buffer solution employed, can be fed to the reactor via the above-mentioned device. Upon completion of the reaction, the amount of hydrogen taken up by the system was measured, which was done with the aid of a liquid manometer fitted across the capillary. The amounts of hydroxylamine and ammonia formed in the reaction mass—the most important reaction products—were regularly determined. The temperature at which the experiments were carried out normally amounted to 25° C.

The gross equations relating to the reactions taking place in the reduction of nitric acid over palladium are:

$$2H^+ + NO_3^- + 3H_2 \rightarrow NH_3OH^+ + 2H_2O$$

$$2H^+ + NO_3^- + 4H_2 \rightarrow NH_4^+ + 3H_2O$$

$$2H^+ + 2NO_3^- + 4H_2 \rightarrow N_2O + 5H_2O$$

$$2H^+ + 2NO_3^- + 5H_2 \rightarrow N_2 + 6H_2O$$

In this connection, the selectivity is defined as:

$$\frac{\text{gram-ions of } NH_3OH^+ \text{ formed}}{\text{gram-ions of } NO_3^- \text{ reduced}} \times 100$$

Under the above-mentioned conditions, the selectivity in a phosphoric acid-dihydrophosphate buffer solution (pH 1.5–2) amounts to 85 to 90%.

The experiments show that the aforementioned elements can increase the rate of the $NO_3^-$-reduction without causing a decrease of the selectivity. The increase of the activity is highly dependent on the element added. See Examples 1, 2 and 3, in particular experiments 4, 7, 8 and 10 of Example 1, experiment 13 of Example 2, and experiments 16, 17 and 18 of Example 3. It has been established for a given element that the activity of the process increases according as more of it is added, there being the restriction, however, that there is an optimum amount above which the activity increases hardly or not at all; see Example 6. This optimum amount of element is also determined by the amount of catalyst employed in the reaction, which appears from Example 7.

The medium in which the reaction is carried out may affect the activity-increase factor, which is defined as:

Activity after addition of activator/ activity before said addition

Compare the Examples 1 and 3 with Example 5 for the element Cd. In the case of the elements Ge and As, for instance, the said factor seems to depend much less or not at all on the medium; compare Example 1 with Example 6, and Examples 1, 2 and 3 with Example 4.

That the invention is not restricted to the addition of only one single element for increasing the activity appears from Examples 8 and 9. In the experiment of Example 8, a combination of compounds was added which contained a few of the above-mentioned elements. In the experiment of Example 8, a mixture of compounds was added which contained a few elements whose capacity for increasing the activity of the reaction system, in case they are used by themselves, was not established.

In most of the experiments, the elements were added to the reaction mixture in the form of a solution of a compound containing the element concerned (aqueous solution, solution in buffer liquid). They can also be added in another way, however. In Example 10 it is pointed out that the catalyst is impregnated with a solution of germanium dioxide in water and subsequently dried before it is subjected to the reaction liquid. This procedure, too, yields a high activity as compared with the use of a non-activated catalyst.

The activities mentioned in the examples have been expressed in ml. of $H_2$ (N.T.P.) per gramme of catalyst per hour. This measure of the activity is suggested by the procedure followed for carrying out the experiments. Furthermore, samples were regularly taken from the reactor to determine the hydroxylamine formation and the selectivity of the process for the purpose of comparing the behaviour of the various activators. Since the selectivity is hardly or not at all affected by the various activators, the amount of hydrogen taken up is a direct measure of the hydroxylamine production. The fact that the experiments were carried out at 25° C. and atmospheric pressure does not imply that the elements found possess their capacity for increasing the activity exclusively at or near this temperature; they will also effect an increase of the activity at higher temperatures and pressures (see Example 11).

The degree of acidity of the reaction system has a strong effect on the reaction rate. The differences in the activity levels between the various tables can largely be accounted for by this fact. If, on the other hand, the degree of acidity is constant, the rate is affected by the composition of the reaction liquid. In the experiments use has invariably been made of phosphoric acid (p.a.).

EXAMPLES (1) Determination of the capacity of a few elements for accelerating the reduction of $NO_3^-$ to hydroxylamine:

Reaction medium: The experiments were carried out in 100 ml. of a liquid having the following composition:

| | G. |
|---|---|
| $H_3PO_4$ | 254 |
| $NH_4H_2PO_4$ | 523 |
| $NaH_2PO_4$ | 253 |
| $(NH_2OH)_2H_2SO_4$ | 266 |
| $H_2O$ | 2760 |
| $NH_4NO_3$ | 788 |

Catalyst: 1.8 g. of 5%-by-weight of palladium on activated carbon used as the carrier material.

Procedure: Upon determination of the activity of the catalyst (measurement of the hydrogen uptake), a solution was added which contained the element to be examined, after which the activity was measured once more.

| Experiment number | Element added | Added in the form of— | Amount (mg.) of the element added per 100 ml. of reaction liquid | Activity before addition in ml. of $H_2$ (N.T.P.) per hour per gramme of catalyst | Activity after addition in ml. of $H_2$ (N.T.P.) per hour per gramme of catalyst |
|---|---|---|---|---|---|
| 1 | As | $Na_2HAsO_4$ | 4.0 | 400 | 900 |
| 2 | Sb | $SbCl_3$ | 2.0 | 400 | 600 |
| 3 | Sb | $SbF_3$ | 4.0 | 400 | 750 |
| 4 | Ge | $GeO_2$ | 0.3 | 400 | 2,100 |
| 5 | Sn | $SnCl_2$ | 2.0 | 400 | 1,900 |
| 6 | Pb | PbO | 11.0 | 400 | 700 |
| 7 | Ga | $Ga_2(SO_4)_3$ | 15.0 | 450 | 1,250 |
| 8 | In | $In_2(SO_4)_3$ | 1.0 | 400 | 2,350 |
| 9 | Tl | $Tl(NO_3)_3$ | 7.5 | 500 | 900 |
| 10 | Cd | $Cd(NO_3)_2$ | 3.0 | 500 | 2,900 |
| 11 | Ag | $AgNO_3$ | 32.0 | 400 | 1,200 |

(2) Similar to Example 1 with the following differences:

Reaction medium: The experiments were carried out in 100 ml. of an aqueous solution containing 2 moles of $H_3PO_4$ and 1 mole of $NaNO_3$ per litre.

Catalyst: 300 mg. of 5%-by-weight palladium on activated carbon.

| Experiment number | Element added | Added in the form of— | Amount (mg.) of the element added per 100 ml. of reaction liquid | Activity before addition in ml. of $H_2$ (N.T.P.) per hour per gramme of catalyst | Activity after addition in ml. of $H_2$ (N.T.P.) per hour per gramme of catalyst |
|---|---|---|---|---|---|
| 12 | As | $Na_2HAsO_4$ | 2.0 | 1,200 | 1,800 |
| 13 | Cu | CuO | 4.0 | 1,000 | 3,900 |
| 14 | Au | $AuCl_3$ | 3.2 | 1,000 | 1,150 |

(3) Similar to Example 1 with the following differences:

Reaction medium: The experiments were carried out in 100 ml. of a liquid having the following composition:

|  | Moles |
|---|---|
| $H_3PO_4$ | 0.44 |
| $NaH_2PO_4$ | 1.56 |
| $H_2O$ | 31.7 |
| $NaNO_3$ | 1.97 |

Catalyst: 1.8 grammes of 5%-by-weight palladium on activated carbon.

(4) Determination of the capacity of As for accelerating the reduction of $NO_3^-$ to hydroxylamine in a reaction medium containing 2 moles of $H_2SO_4$ and 1 mole of $NaNO_3$ per litre of aqueous solution:

The experiment was carried out in 100 ml. of this liquid.

The catalyst consisted of 5%-by-weight palladium on activated carbon; 300 mg. of it were used in this experiment.

The initial activity of the catalyst amounted to 2000 ml. of $H_2$ (N.T.P.) per hour per gramme of catalyst. Upon addition of 3.6 mg. of As in the form of a $Na_2HAsO_4$ the activity increased to 3500 ml. of $H_2$ (N.T.P.) per hour per gramme of catalyst.

(5) Determnination of the capacity of Cd for accelerating the reduction of $NO_3^-$ to hydroxylamine in a reaction medium containing 2 moles of $H_2SO_4$ and 1 mole of $NaNO_3$ per litre of aqueous solution:

The experiment was carried out in 100 ml. of this liquid.

The catalyst consisted of 5%-by-weight palladium on activated carbon; 600 mg. of it were used in this experiment.

The initial activity of the catalyst amounted to 1700 ml. of $H_2$ (N.T.P.) per hour per gramme of catalyst. Upon addition of 0.7 mg. of Cd in the form of $Cd(NO_3)_2$ the activity increased to 2300 ml. of $H_2$ (N.T.P.) per hour per gramme of catalyst.

(6) Effect of the amount of activator on the activity in the case of a constant amount of catalyst:

Reaction medium: The experiments were carried out in 100 ml. of an aqueous solution containing 2 moles of $H_2SO_4$, 3 moles of NaOH and 1 mole of $NaNO_3$ per litre. solution containing 2 moles of $H_2SO_4$, 3 moles of NaOH and 1 mole of $NaNO_3$ per litre.

Catalyst: 200 mg. of 5%-by-weight palladium on activated carbon.

| Experiment number | Element added | Added in the form of— | Amount (mg.) of the element added per 100 ml. of reaction liquid | Activity before addition in ml. of $H_2$ (N.T.P.) per hour per gramme of catalyst | Activity after addition in ml. of $H_2$ (N.T.P.) per hour per gramme of catalyst |
|---|---|---|---|---|---|
| 15 | As | $Na_2HAsO_4$ | 5.0 | 400 | 850 |
| 16 | Sn | $SnCl_2$ | 0.4 | 200 | 1,520 |
| 17 | In | $In_2(SO_4)_3$ | 0.8 | 200 | 1,250 |
| 18 | Cd | $Cd(NO_3)_2$ | 1.2 | 200 | 1,250 |
| 19 | Hg | $Hg(NO_3)_2$ | 4.2 | 300 | 550 |

Activator: Germanium, added in the form of germanium dioxide.

| Mg. of Ge added: | (N.T.P.)/(hr.)(g. of cat.) |
|---|---|
| nihil | 450 |
| 0.05 | 1400 |
| 0.1 | 2200 |
| 0.2 | 2750 |
| 0.3 | 2800 |
| 0.4 | 2800 |

(7) The amount of Ge to be added for attaining the maximum activity in the $NO_3^-$ reduction as a function of the amount of catalyst:

Reaction medium: The experiments were carried out in 100 ml. of an aqueous solution containing 1 mole of $KHSO_4$ plus 1 mole of $NaNO_3$ per litre.

Catalyst: 5%-by-weight palladium on activated carbon.
Activator: Ge, added in the form of $GeO_2$.

| Amount of catalyst (mg.): | Amount of Ge required for attaining the maximum activity (mg.) |
|---|---|
| 100 | 0.1 |
| 300 | 0.3 |
| 600 | 0.65 |

(8) Determination of the capacity for accelerating the reduction of $NO_3^-$ to hydroxylamine of a mixture of compounds each of which contained an activating component as mentioned in the Examples 1–3:

The reaction was carried out in 100 ml. of the reaction liquid described in Example 3. The catalyst consisted of 5%-by-weight palladium on activated carbon; the amount of catalyst was 1.8 g. The initial activity of the catalyst amounted to 300 ml. of $H_2$ (N.T.P.) per hour per gramme of catalyst. Upon addition of a solution containing $CuSO_4$, $In_2(SO_4)_3$, $GeO_2$ and $Na_2HAsO_4$ in amounts corresponding with 3.2 mg. of Cu, 0.64 mg. of In, 0.17 mg. of Ge and 5.7 mg. of As, an activity of 1100 ml. of $H_2$ (N.T.P.) per hour per gramme of catalyst was attained.

(9) Determination of the capacity for accelerating the reduction of $NO_3^-$ to hydroxylamine of a mixture of compounds containing one or more activating elements (as mentioned in the Examples 1, 2 and 3).

The reaction was carried out in 100 ml. of the reaction liquid described in Example 1.

The catalyst consisted of 5%-by-weight palladium on activated carbon; the amount of catalyst was 1.8 grammes.

The initial activity of the catalyst amounted to 400 ml. of $H_2$ (N.T.P.) per hour per gramme of catalyst. Upon addition of a solution containing the elements Ni (1.6 mg.), Cr (2.4 mg.), Fe (32 mg.), Cu (3.2 mg.) and Pb (3.2 mg.), the activity increased to 2000 ml. of $H_2$ (N.T.P.) per hour per gramme of catalyst.

Note: A solution containing only Ni+Cr+Fe did not produce an increase of the activity.

(10) Comparison of the activity of two catalyst under the same reaction conditions:

One of the catalysts had previously been loaded with the element Ge.

Reaction medium: The experiments were carried out in 100 ml. of an aqueous solution having the composition indicated in Example 3.

Catalyst 1: 5%-by-weight palladium on carbon; amount 1.8 grammes.

Catalyst 2: Equal to catalyst 1; 10 grammes of this catalyst was impregnated with 100 ml. of water containing 40 mg. of $GeO_2$ and then dried. Just as in the case of the first catalyst, an amount of 1.8 grammes was employed.

| Catalyst: | Reaction rate in ml. of $H_2$ (N.T.P.)/(h.)(g. of cat.) |
|---|---|
| 1 | 300 |
| 2 | 2000 |

(11) In a continuously operating test-reactor with a capacity of 30 l., which was provided with an agitator, 17.5 grammes of catalyst were suspended per litre of solution.

The catalyst mass consisted of activated carbon to which 5%-by-weight palladium had been applied. Each kg. of the solution contained:

| | Moles |
|---|---|
| Phosphoric acid | 0.50 |
| Hydroxylammonia dihydrophosphate | 0.69 |
| Ammonium hydrophosphate | 0.98 |
| Ammonium nitrate | 2.08 |

Per kg. of catalyst, 100 mg. of germanium were added to the suspension in the form of germanium dioxide. The feed to this continuous process for the preparation of hydroxylamine consisted of recycled reactor effluent, from which catalyst mass as well as hydroxylammonium salt, water and amomnium nitrate formed in the process were removed and to which phosphoric acid and ammonium nitrate were added in amounts of 2.15 moles and 2.85 moles per kg., respectively. The amount of catalyst separated off was also fed back to the reactor.

At a reaction temperature of 75° C. and a partial hydrogen pressure of 6.5 ata., a yield was obtained of 66.5 grammes of hydroxylamine per hour per gramme of palladium, the selectivity being 75%. If no germanium dioxide would have been added, the yield would only have been about 30 g. of hydroxylamine per gramme of palladium. It should be observed that under the above-mentioned conditions the mass transfer from the hydrogen to the catalyst affected the production unfavourably. In the case of the catalyst activated with the aid of germanium dioxide, the limiting effect of the mass transfer on the hydroxylamine yield is of course stronger than in the case of the catalyst which has not been activated in that way.

(12) Reduction of $NO_3^-$ by means of a platinum containing catalyst:

In a reaction liquid containing 2 moles of phosphoric acid (p.a.) and 1 mole of sodium nitrate per litre, 3 g. of catalyst mass containing 5%-by-weight of platinum on coal were suspended per 1 litre of liquid at 1 atm. pressure and 25° C. No reduction of $NO_3^-$ was observed. Upon addition of 5 mg. of germanium dioxide, reduction of the $NO_3^-$ started immediately.

Activity before addition of $GeO_2$=0 ml. $H_2$ (N.T.P.)/(h.)(g. cat.).

Activity after addition of $GeO_2$=600 ml. $H_2$ (N.T.P.)/(h.)/(g. cat.).

The molar ratio in the reaction product was hydroxylamine/ammonia=1

We claim:

1. In a process for the preparation of salts of hydroxylamine by reducing nitric acid with hydrogen with the aid of a catalyst containing at least one metal from the platinum group, the improvement consisting essentially in effecting the reduction in an aqueous buffered acidic medium containing an acidic buffering agent selected from the group consisting of phosphoric acid and sulfuric acid in admixture with the alkali metal and ammonium salts, respectively, thereof, and in the presence of about 0.2 to 20 atom-percent with respect to the amount of said catalyst of at least one activator for said catalyst, said activator comprising an element selected from the class consisting of germanium, cadmium, indium, tin, gallium and silver.

2. A process as claimed in claim 1 wherein palladium is used as the catalyst.

3. A process as claimed in claim 1 wherein the activator is applied to the catalyst particles.

4. The process of claim 1 wherein said activator is present as a compound selected from the class consisting of an oxide, a salt in which said element forms part of the cation or anion, and a complex compound of said element.

References Cited
UNITED STATES PATENTS

| | | | |
|---|---|---|---|
| 3,009,779 | 11/1961 | Wintersberger | 423—387 |
| 3,295,925 | 1/1967 | Fueg et al. | 423—387 |
| 3,119,657 | 1/1964 | Horwitz et al. | 23—190 A |
| 3,390,958 | 7/1968 | De Rooij et al. | 23—50 |

FOREIGN PATENTS

| | | | |
|---|---|---|---|
| 1,432,342 | 2/1966 | France | 23—50 |
| 956,038 | 1/1957 | Germany | 23—50 |
| 772,693 | 4/1957 | Great Britain | 23—50 |

HERBERT T. CARTER, Primary Examiner

U.S. Cl. X.R.

423—387